Patented Nov. 4, 1952

2,616,788

UNITED STATES PATENT OFFICE 2,616,788

METHOD OF LOWERING THE TENDENCY TOWARDS SETTING OF AMMONIUM SULFATE AND AMMONIUM SULFATE OF FREE-FLOWING FORM WITH A REDUCED TENDENCY TO SETTING

Alexander Butchart, Ardrossan, and John Whetstone, West Kilbride, Scotland, assignors to Imperial Chemical Industries Limited, a corporation of Great Britain No Drawing. Application April 5, 1949, Serial No. 85,728. In Great Britain December 8, 1948

7 Claims. (Cl. 23—119)

The present invention is concerned with a method of lowering the tendency towards setting of ammonium sulphate and with providing ammonium sulphate of free-flowing form with a reduced tendency to setting.

The invention is particularly applicable to ammonium sulphate in a state of fine subdivision; that is to say, for example, ammonium sulphate ground in a mill to a degree of fineness such that it is capable of passing through a 60 or 100 mesh sieve (BSS). The invention can also be applied to finely divided ammonium sulphate produced by a crystallization process capable of passing through e. g. a 30, 60 or 100 mesh sieve (BSS). Naturally coarse grained free-flowing ammonium sulphate, as crystallized in commercial manufacturing processes, for example, ammonium sulphate capable of passing through a 6 mesh sieve and retained by a 12 mesh sieve, can also beneficially be treated according to the invention, it is however far easier to prevent the setting of this coarse grained ammonium sulphate than of the finely pulverized materials.

This application is related to application Serial No. 85,024, filed April 1, 1949, to Butchart. That application discloses and claims the formation of a free-flowing potassium nitrate by the addition thereto of small amounts of a sulphonated aromatic dyestuff which are soluble in a saturated aqueous solution of potassium nitrate, and which in such solution conditions it to produce on crystallization potassium nitrate in the form of thin fragile crystals which are friable owing to their facial development relative to the cleavage planes.

According to the present invention the method of lowering the tendency towards setting of ammonium sulphate comprises treating the ammonium sulphate with a dyestuff of sulphonated aromatic character which in solution in a saturated aqueous solution of ammonium sulphate conditions said ammonium sulphate solution to produce on crystallization ammonium sulphate in the form of thin and fragile crystals, possessing [001] crystal habit and being thereby friable owing to their facial development relative to the cleavage planes of the crystals.

According to the present invention ammonium sulphate which is non-cohering and free-flowing form contains a dyestuff of sulphonated aromatic character which in solution in a saturated aqueous solution of ammonium sulphate conditions said ammonium sulphate solution to produce on crystallization ammonium sulphate in the form of thin fragile crystals, friable owing to their facial development relative to the cleavage planes.

The phrase "dyestuff of sulphonated aromatic character" includes soluble salts of an aromatic dyestuff having at least one sulphonic acid group and aromatic dyestuffs having at least one sulphonic acid substituent group per dye molecule.

Particularly suitable dyestuffs which most markedly lower the tendency towards setting of ammonium sulphate are:

Edicol Amaranth (Colour Index No. 184), which chemically is the sodium salt of 4-sulpho α naphthalene-azo-β naphthol-3.6 disulphonic acid ($C_{20}H_{11}N_2O_{10}S_3Na_3$).

Tartrazine (Colour Index No. 640), which chemically is the sodium salt of 4-p-sulphobenzene-azo - 1 - p - sulphophenyl - 5 - hydroxy-pyrazol 3-carboxylic acid ($C_{16}H_9N_4O_9S_2Na_3$).

Examples of dyestuffs of sulphonated aromatic character which are soluble in saturated ammonium sulphate solution but which in lesser degree than the above reduce the setting tendency of ammonium sulphate are:

Naphthol Green BNS (Colour Index No. 5)
Fast Yellow (Colour Index No. 16)
Naphthalene Fast Orange (Colour Index No. 27)
Azofuchsine G (Colour Index No. 153)
Ponceau 6R (Colour Index No. 186)
Chromazol Yellow (Colour Index No. 441)
Chlorazol Sky Blue (Colour Index No. 518)
Fast light Yellow (Colour Index No. 636)
Lissamine Fast Yellow (Colour Index No. 639)
Disulphine Blue V (Colour Index No. 712)
Disulphine Blue AS (Colour Index No. 714)
Xylene Cyanol FF (Colour Index No. 715)

The following dyestuffs exemplify those soluble in water, and at the most only slightly soluble in saturated ammonium sulphate solutions, but even so which have a slight tendency to reduce the setting and also to maintain the free-flowing nature of ammonium sulphate:

Brilliant Cochineal (Colour Index No. 77)
Bordeaux (Colour Index No. 88)
Crystal Ponceau (Colour Index No. 89)
Carmoisine WS (Colour Index No. 179)
Carmoisine LS (Colour Index No. 180)
Naphthalene Red EAS (Colour Index No. 182)
Bismarck Brown (Colour Index No. 331)
Hydrazine Yellow SO (Colour Index No. 637)
Eriochrome Red (Colour Index No. 652)
Acid Green G (Colour Index No. 666)
Acid Green M (Colour Index No. 669)
Acid Green GG Extra (Colour Index No. 670)
Erioglaucine Extra (Colour Index No. 671)
Fast Acid Violet 10B (Colour Index No. 696)
Acid Violet 4BNS (Colour Index No. 698)

It has been found that the addition of, for example, between 0.001 and 0.10 part of Edicol Amaranth or Tartrazine to 100 parts of ammonium sulphate capable of passing through a 100 mesh screen lessens the tendency of the ammonium sulphate towards caking or setting.

The following examples illustrate how ammonium sulphate according to the invention can be produced. The parts are parts by weight.

*Example 1*

A saturated aqueous solution at 40° C. of ammonium sulphate, containing 0.1% of the added azo-dye Amaranth (C. I. No. 184) on cooling crystallizes in the altered habit of thin hair-like crystals of extreme fragility.

*Example 2*

Ammonium sulphate (1000 gm.) ground and sieved through a 100 BSS sieve, is mixed with 10 ml. of water containing in solution 1 gm. of Amaranth, in a hot water jacketed mixing machine such as a Werner-Pfleiderer incorporator, so that the dye is uniformly distributed over the individual particles. Following evaporation of the added water, the finely divided ammonium sulphate may be stored for long periods without the occurrence of any hard caking. Untreated ammonium sulphate of similar grist is found to cake rapidly under similar conditions involving exposure to atmosphere moisture.

*Example 3*

Ammonium sulphate is crystallized with rapid cooling and stirring to give small crystals. The crystals are isolated, and in their wet state are treated with .05% of the dye by spraying with a 10 per cent aqueous solution of Amaranth, and are then passed through a rotary drier so that the dyestuff is uniformly distributed. The dry salt emerging is found to be free from any tendency towards hard setting under normal storage conditions.

*Example 4*

Ammonium sulphate is crystallized in the presence of a small quantity of aluminium sulphate to give crystals, consisting of equant pseudohexagonal rhombs such as are frequently produced in commercial practice. The crystals vary in size, but material passing a 6 BSS and held by a 12 BSS sieve would be a usual product. The crystals, wet with their mother liquor, are treated with .01% of Amaranth by spraying with a 1% aqueous solution of the dye, and are passed through a rotary drier to ensure distribution of the dyestuff. The dry crystals produced may be stored for long periods without hard setting occurring.

*Example 5*

The procedure is the same as for Example 1 except that Tartrazine (C. I. No. 640) is used instead of Amaranth.

*Example 6*

The procedure is the same as for Example 2 except that Tartrazine is used instead of Amaranth.

*Example 7*

The procedure is the same as for Example 3 except that Tartrazine is used instead of Amaranth.

*Example 8*

The procedure is the same as for Example 4 except that Tartrazine is used instead of Amaranth.

*Example 9*

The procedure is the same as for Example 2 except that "Chlorazol Sky Blue FF" (C. I. No. 518) is used instead of "Amaranth." The finely divided ammonium sulphate obtained after evaporation of the added water may be stored for long periods without the occurrence of any hard caking as long as moisture uptakes of the order of 0.1% are not exceeded.

*Example 10*

The procedure is the same as for Example 9 except that "Chromazol Yellow CRS" (C. I. No. 441) is used instead of "Chlorazol Sky Blue FF." The finely divided ammonium sulphate obtained has the same characteristics as the ammonium sulphate of Example 9.

*Example 11*

The procedure is the same as for Example 2 except that "Carmoisine LS" (C. I. No. 180) is used instead of Amaranth. The dry crystals produced show a somewhat lessened tendency towards cohering on standing as compared with similar untreated material.

*Example 12*

The procedure is the same as for Example 11 except that "Acid Violet 4BNS" (C. I. No. 698) is used instead of "Carmoisine LS." The properties of the dry crystals are the same as those of Example 11.

We claim:

1. Ammonium sulphate in non-cohering and free-flowing form comprising crystals of ammonium sulphate containing, per 100 parts of ammonium sulphate, from 0.001 to 0.10 parts of the sodium salt of 4-sulpho-$\alpha$-naphthalene-azo-$\beta$-naphthol-3.6 disulphonic acid.

2. Ammonium sulphate in non-cohering and free-flowing form comprising crystals of ammonium sulphate containing, per 100 parts of ammonium sulphate, from 0.001 to 0.10 parts of the sodium salt of 4-p-sulphobenzene-azo-1-p-sulphophenyl - 5 - hydroxy - pyrazol - 3 - carboxylic acid.

3. A free flowing ammonium sulphate comprising crystals of ammonium sulphate containing per 100 parts of ammonium sulphate from 0.001 to 0.10 part of at least one sulphonated aromatic dyestuff predominantly distributed on the surface of the said crystals which is soluble to at least the aforesaid extent in a saturated aqueous solution of ammonium sulphate and which in such solution conditions said solution to produce on crystallization ammonium sulphate in the form of thin fragile crystals, possessing [001] crystal habit and being thereby friable owing to their facial development relative to the cleavage planes.

4. A method of lowering the tendency towards setting of ammonium sulphate which comprises treating ammonium sulphate with from 0.001 to 0.10 part of a sulphonated aromatic dyestuff per 100 parts of ammonium sulphate, said dyestuff being one which is soluble to at least the aforesaid extent in a saturated aqueous solution of ammonium sulphate and in such solution conditions said solution to produce on crystallization ammonium sulphate in the form of thin fragile crystals, possessing [001] crystal habit and being thereby friable owing to their facial development relative to the cleavage planes.

5. A method of lowering the tendency towards setting of ammonium sulphate which comprises treating the ammonium sulphate with the sodium salt of 4-sulpho-α-naphthalene-azo-β-naphthol-3.6 disulphonic acid in the ratio of from 0.001 to 0.10 parts of said sodium salt per 100 parts of sulphate.

6. A method of lowering the tendency towards setting of ammonium sulphate which comprises treating the ammonium sulphate with the sodium salt of 4 - p - sulphobenzene-azo - 1 - p - sulphophenyl-5-hydroxy-pyrazol-3-carboxylic acid in the ratio of from 0.001 to 0.10 parts of said sodium salt per 100 parts of sulphate.

7. A process for the production of free-flowing ammonium sulphate which comprises effecting crystallization of an aqueous solution of ammonium sulphate containing from 0.001 to 0.10 part per 100 parts of ammonium sulphate in solution of at least one sulphonated aromatic dyestuff which is soluble to at least the aforesaid extent in a saturated aqueous solution of ammonium sulphate and in such solution conditions said solution to produce on crystallization ammonium sulphate in the form of thin fragile crystals, possessing [001] crystal habit and being thereby friable owing to their facial development relative to the cleavage planes.

ALEXANDER BUTCHART.
JOHN WHETSTONE.

REFERENCES CITED

The following references are of record in the file of this patent:

UNITED STATES PATENTS

| Number | Name | Date |
|---|---|---|
| 1,056,365 | Raschig | Mar. 18, 1913 |
| 1,310,037 | Snelling | July 15, 1919 |
| 1,550,064 | Ehrlich | Aug. 18, 1925 |
| 2,009,437 | Coolidge et al. | July 30, 1935 |
| 2,030,583 | Staas et al. | Feb. 11, 1936 |
| 2,092,073 | Jeltsch et al. | Sept. 7, 1937 |
| 2,228,742 | Applebey | Jan. 14, 1941 |